United States Patent
Yang et al.

(10) Patent No.: US 12,494,018 B2
(45) Date of Patent: Dec. 9, 2025

(54) MINE DIGITAL MODEL CONSTRUCTION METHOD BASED ON THREE-DIMENSIONAL POINT CLOUD DATABASE

(71) Applicant: CHINA UNIVERSITY OF MINING AND TECHNOLOGY, Xuzhou (CN)

(72) Inventors: Wei Yang, Xuzhou (CN); Wenyuan Wang, Xuzhou (CN); Yingte Feng, Xuzhou (CN); Wenxiao Zhang, Xuzhou (CN); Zening Wei, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 18/580,031

(22) PCT Filed: Mar. 27, 2023

(86) PCT No.: PCT/CN2023/084075
§ 371 (c)(1),
(2) Date: Jan. 17, 2024

(87) PCT Pub. No.: WO2023/185734
PCT Pub. Date: Oct. 5, 2023

(65) Prior Publication Data
US 2024/0346758 A1     Oct. 17, 2024

(30) Foreign Application Priority Data
Mar. 28, 2022   (CN) .................. 202210312210.9

(51) Int. Cl.
G06T 17/05        (2011.01)
G06F 16/28        (2019.01)
G06T 17/20        (2006.01)

(52) U.S. Cl.
CPC ............ G06T 17/05 (2013.01); G06F 16/283 (2019.01); G06T 17/205 (2013.01); *G06T 2210/56* (2013.01)

(58) Field of Classification Search
CPC ... G06T 17/05; G06T 17/205; G06T 2210/56; G06F 16/283
(Continued)

(56) References Cited

U.S. PATENT DOCUMENTS

2010/0042381 A1   2/2010   Stankus et al.
2020/0213426 A1*  7/2020   Sennersten ............. G06T 17/05
2021/0407298 A1* 12/2021   Murphy .................. G08G 1/205

FOREIGN PATENT DOCUMENTS

CN    111210359     * 12/2019   ............. G06Q 50/02
CN    113962008 A     1/2022
(Continued)

OTHER PUBLICATIONS

Jin, B.X., Fang, Y.M., Song, W.W., 2011. 3D visualization model and key techniques for digital mine. Trans. Nonferrous Met. Soc. China (English Ed. 21, s748-s752. https:// doi.org/10.1016/S1003-6326(12)61674-4.*

(Continued)

*Primary Examiner* — Jin Ge
(74) *Attorney, Agent, or Firm* — Sage Patent Group (57) ABSTRACT

A mine digital model construction method based on a three-dimensional point cloud database is disclosed. Mine data resources are collected, valid coordinate point position information is extracted according to point cloud data extraction standards, and a mine three-dimensional point cloud database is established; a model of rock strata boundary surfaces, mining areas, and tunnels is constructed, a surface three-dimensional geological model is constructed, and a mine three-dimensional geological model is further
(Continued)

constructed; and division into grids is performed to obtain a mine extraction inversion digital model. According to the method, a mine three-dimensional point cloud database can be obtained, and various identified rock strata topographies, positions of mining areas and tunnels, fault morphologies, and surface morphologies can be restored; mine extraction inversion digital models having different precisions can be constructed, a foundation is laid for crustal stress field inversion, and a reliable basis is provided for mine disaster prevention and control.

7 Claims, 2 Drawing Sheets

(58) Field of Classification Search
USPC .......................................................... 345/423
See application file for complete search history.

(56) References Cited

FOREIGN PATENT DOCUMENTS

| | | |
|---|---|---|
| CN | 114005051 A | 2/2022 |
| CN | 114663627 A | 6/2022 |
| WO | 2022057397 A1 | 3/2022 |

OTHER PUBLICATIONS

International Search Report and Written Opinion and English Translation, International Application No. PCT/CN2023/084075, mailed Aug. 3, 2023, 10 pages.

Jiang, et al, "3-D Modeling Method of Mine Roadway Based on 3-D Laser Scanning Point Cloud", Coal Mining Technology vol. 21 No. 2, Series No. 129, Apr. 2016, 5 pages.

* cited by examiner

MINE DIGITAL MODEL CONSTRUCTION METHOD BASED ON THREE-DIMENSIONAL POINT CLOUD DATABASE

CROSS REFERENCE TO RELATED APPLICATIONS

This application is a 35 U.S.C. § 371 national stage application of PCT International Application No. PCT/CN2023/084075 filed on Mar. 27, 2023, which in turn claims priority to Chinese Patent Application No. 202210312210.9, filed on Mar. 28, 2022, the disclosures and content of which are incorporated by reference herein in their entireties.

TECHNICAL FIELD

The present disclosure relates to a digital mine modeling method based on a three-dimensional point cloud database, and belongs to the technical field of three-dimensional digital mine modeling.

BACKGROUND

With the continuous exploitation of underground mineral resources, mining depth and intensity are gradually increasing. Once the mine dynamic disasters occur, they will have serious impacts on personnel safety and mine production. Ground pressure observation is the main decision-making basis for solving mining problems at present, and has influence on the decision-making and deployment for major technical problems such as pressure control of roadway, design of mining program, reasonable selection and maintenance of roadway location, prediction, prevention and control of rock burst and outburst, and safe coal mining above confined aquifer. Ground pressure observation is limited by test location and high cost. Therefore, it is difficult to carry out large-scale monitoring in mining areas with ground pressure observation. The development of simulation technology has solved the problem of limited actual measurement and can provide comprehensive and scientific guidance for field practice.

One of the keys for simulation is modeling, and the accuracy of the model is an important basis for the reliability of the simulation result. The establishment of large-scale complex models has always been the most important concern of scholars. The models established previously have three shortcomings: 1) the models are small, and mostly models of local mining areas; 2) the models are simple, in which the actual geological structures such as coal seam folds and faults, etc. are ignored; 3) professional modeling software is rarely used in the mine models established previously, and the built-in modeling modules of most simulation software are relatively simple, and cannot meet the modeling requirements under complex geological conditions. The present disclosure employs professional 3D modeling software Rhino, which can reproduce the actual appearance of the coal seam, improve the fitness with the actual field, and meet the requirements of complex large-scale mine modeling.

A point cloud model is often obtained directly from measurement, and each point corresponds to a measurement point without other processing means. Therefore, the point cloud model contains a maximum amount of information. However, the information concealed in the point cloud needs to be extracted by other extraction methods, and the process of extracting information in the point cloud is three-dimensional image processing.

The idea of three-dimensional point cloud modeling has been applied in many fields. The surface attribute point information of the target object is usually acquired in a non-contact method to obtain three-dimensional point cloud data, but the internal structure of the target object is not finely modeled. At present, in the mining field, three-dimensional laser scanning technology is applied to the above-ground model of opencast mines and side slopes, etc., but there is no detailed research on underground complex modeling. Therefore, the present disclosure introduces in detail an digital modeling method for complex mining inversion, and focuses on the application of an idea of three-dimensional point cloud modeling in the establishment of an underground model.

SUMMARY

In view of the shortcomings in the prior art, the present disclosure provides a digital mine modeling method based on a three-dimensional point cloud database. By establishing a three-dimensional point cloud database for a mine and using a three-dimensional modeling software, a digital model for mining inversion can be established to reflect the rock relief and extension, mining areas and roadway locations, and geological structures.

To attain the objective described above, the present disclosure provides a digital mine modeling method based on a three-dimensional point cloud database, including: collecting mine data, extracting effective coordinate point position information of rock interfaces according to criteria for extracting point cloud data, establishing a three-dimensional point cloud database of the mine; establishing a model of rock interfaces, mining areas and roadways by using the three-dimensional point cloud data of the mine, so as to establish a three-dimensional geological model of the ground surface and establish a three-dimensional geological model of the mine; performing grid division on the three-dimensional geological model of the mine, to obtain a digital model for mining inversion that reproduces each identified rock strata relief, mining areas and roadway locations, fault morphology and surface morphology. Thus, the fitness and accuracy of the model are improved.

The method includes the following steps:

S1. determining dimensions of the model by collecting geological data of a target mining area, and analyzing and obtaining spatial coordinate sets of upper and lower interfaces of each rock stratum, a spatial coordinate set of inflection points of mining sections, a spatial coordinate set of inflection points of key roadways, a spatial coordinate set of contour lines of the ground surface, fault locations, fault displacements and fault angles;

S2. processing the spatial coordinate sets of the upper and lower interfaces of each rock stratum, extracting effective coordinate point position information, and establishing a three-dimensional point cloud database of the mine;

S2.1. determining the model accuracy $\varepsilon$ ($0<\varepsilon<1$) according to simulation requirements;

S2.2. determining a criteria for extracting the three-dimensional point cloud data of the mine and a minimum significant coefficient for the extracted spatial coordinate sets of the rock interfaces;

supposing there are m spatial coordinate sets of rock interfaces and n criteria for extracting the three-dimensional point cloud data of the mine, calculating a significant coefficient $P_k$ for the $k^{th}$ spatial coordinate set of rock interfaces with the following formula:

$$P_k = \sum_{i=1}^{n} w_i X_i + l \ (1 \le k \le m, 1 \le i \le n)$$

$$\sum_{i=1}^{n} w_i = 1, X_i \in (0, 10), l \in (0, 1);$$

where $X_i$ is the significant coefficient of a criterion i in the n criteria for extracting the three-dimensional point cloud data of the mine, $w_i$ is a weight of the criterion i, and l is a correction coefficient;

determining a minimum significant coefficient $P_{min}$ for the extracted spatial coordinate sets of the rock interfaces, which meets $$\frac{P_{min}}{P_{max}} > \varepsilon,$$

according to the simulation requirements, where $P_{max}$ is a maximum significant coefficient;

S2.3. directly extracting the spatial coordinate sets of the rock interfaces that meet $P_k \ge P_{min}$ into the three-dimensional point cloud database of the mine and designating names to them respectively;

S2.4. categorizing spatial coordinate sets for remaining rock interfaces into two categories, i.e., coordinate sets that meet $$\frac{P_k}{P_{max}} \ge \alpha\varepsilon$$

or coordinate sets that meet $$\frac{P_k}{P_{max}} < \alpha\varepsilon,$$

where $\alpha$ is an adjustable coefficient and $\alpha \in (0, 1)$; deleting rock strata that meet $$\frac{P_k}{P_{max}} < \alpha\varepsilon,$$

i.e., combining the rock strata with neighboring rock strata that meet $$\frac{P_k}{P_{max}} \ge \alpha\varepsilon$$

to form new coordinate sets for rock interfaces, and extracting the coordinate sets into the three-dimensional point cloud database of the mine and designating names to them respectively;

S3. establishing an underground part of a three-dimensional geological model that reproduces fault morphology, mining areas and roadways;

S3.1. importing the spatial coordinate sets of upper and low interfaces of the identified rock strata into Rhino software, and fitting the rock interfaces hierarchically from bottom to top with the Rhino software; establishing a cuboid model according to the dimensions of the model, cutting the rock strata according to the rock interfaces obtained through the fitting and designating names to the rock strata respectively, so as to obtain a three-dimensional underground geological model in a cuboid structure;

S3.2. establishing fault boundaries according to the fault locations, cutting the coal seam according to the fault angles; and adjusting the cut coal seam according to the fault displacements to reproduce fault morphology;

S3.3. inputting the spatial coordinate set of the inflection points of mining sections and the spatial coordinate set of the inflection points of key roadways into the Rhino software, and fitting mining sections and key roadways at the working faces and designating names to them respectively;

S3.4. performing Boolean operations on the spatial model of the rock strata, the mining sections and the key roadways, removing a redundant part in the spatial model of the rock strata, so as to form the underground part of the three-dimensional geological model of the entire mining area;

S4. establishing a three-dimensional geological model of the ground surface according to the spatial coordinate set of the contour lines of the ground surface, designating a name to it, and combining the two models together, so as to establish the three-dimensional geological model of the entire mining area;

S5. performing grid division on the three-dimensional geological model of the entire mining area by using the grid division tool that comes with the Rhino software, setting a grid dimension according to actual requirements, performing grid division on the model again by using a plug-in Griddle, and modifying grids by limiting a grid shape and maximum and minimum edge dimensions, so as to make the grid change uniform; exporting the model as a grid file that can be recognized by FLAC 3D software, and importing the grid file into the simulation software, so as to obtain a digital model for mining inversion of the entire mine.

The geological data collected in the step S1 includes a mining engineering plan, an engineering geological profile, a geological borehole histogram and a contour map of the coal seam floor of the target mining area. The spatial coordinate sets of the upper and lower interfaces of the rock strata, the spatial coordinate set of the inflection points of mining sections, the spatial coordinate sets of the inflection points of key roadways, the spatial coordinate set of the contour lines of the ground surface, the dimensions of the model, the fault locations, the fault angles and the fault displacements are obtained by analyzing the geological data of the target mining area. The key roadways mainly refer to the return-air roadways and haulage roadways of the sections.

The spatial coordinate sets of the upper and lower interfaces of the rock strata in the step S1 are obtained by analyzing the geological borehole histogram. Because of fixed latitude distance and longitude distance of each borehole, the horizontal coordinate X and the vertical coordinate Y in the coordinate set of the boreholes can be directly obtained. According to the number p of rock strata and a buried depth $h_j$, the coordinate set of the boreholes can be obtained as $(X, Y, h_1), (X, Y, h_2), \ldots, (X, Y, h_j), \ldots, (X,$ Y, $h_{p+1}$) from top to bottom, where $h_j \leq h_{p+1}$. All obtained coordinates are classified according to the geological unit "section" first, and further classified according to different rock strata in each "section", so that spatial coordinate sets of the upper and lower interfaces of the rock strata are obtained.

The model accuracy ε in the step S2 is the precision of the simulation model reproduction determined according to the simulation requirements, which can be the precision of some local continuous strata reproduction or the precision of all the strata reproduction. The richer the geological data and the denser the geological boreholes are, the higher the maximum reproduction accuracy of the model is. Because it is impossible to achieve 100% reproduction of the underground appearance of the mine, ε is smaller than 1.

The criteria for extracting three-dimensional point cloud data of the mine in the step S2 are detailed requirements determined according to the simulation requirements, the underground rock morphology of the mine, the geological borehole histogram, and the spatial coordinate sets of rock interfaces. The precision of the detailed requirements directly influences the establishment of the three-dimensional point cloud database of the mine.

The identified rock strata in the step S3 refer to the rock strata identified in the three-dimensional point cloud database of the mine. The higher the model accuracy is and the more detailed the criteria for extracting the three-dimensional point cloud data of the mine is, the more the number of identified rock strata is. The identified rock strata gradually formed chronologically in the long geological period can be used to distinguish stratigraphic information and geological age in the process of geological investigation, borehole exploration and mining.

In the step S3, since the mining sections and the key roadways spatially overlap with the spatial model of the rock strata respectively, the difference operation in the Boolean operation function of the software is used to perform difference operation on the spatial model of the rock strata, the mining sections and the key roadways, so as to cut out the mining sections and the key roadways in the spatial model of the rock strata and avoid overlapping of spatial locations. Thus, the spatial model of the rock strata, the mining sections and the key roadways constitute the underground part of the three-dimensional geological model of the entire mining area.

Beneficial effects: 1) in the method, an idea of three-dimensional point cloud modeling is applied to strata, and a three-dimensional point cloud database of the mine can be obtained according to the method; 2) The method can not only reproduce the actual geological structure of the coal seam, the relief and extension of the rock strata and the surface morphology to a maximum extent, but also establish digital mining inversion models with different precision according to the simulation requirements. Using this method to model and perform the ground stress field inversion can provide more comprehensive and scientific guidance for field practice such as mine development, roadway layout and support, etc.

DETAILED DESCRIPTION

Some embodiments of the present disclosure will be further described below with reference to the accompanying drawings.

Embodiment 1

Figure 1:
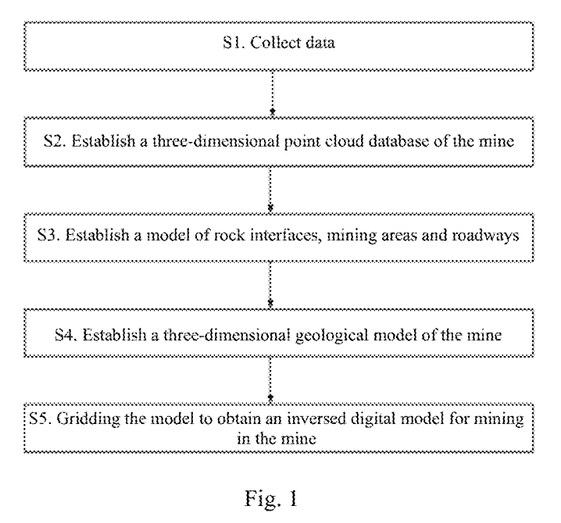
FIG. 1 is a flow chart of the digital mine modeling method based on a three-dimensional point cloud database in the present disclosure.

As shown in FIG. 1, a digital mine modeling method based on a three-dimensional point cloud database, including the following steps:

S1. Collecting data;

Collecting a mining engineering plan, an engineering geological profile map, a geological borehole histogram, and a contour map of the coal seam floor of the target mining area, determining the dimensions of the model, and analyzing and obtaining spatial coordinate sets of the upper and lower rock interfaces, a spatial coordinate set of the inflection points of mining sections, a spatial coordinate set of the inflection points of key roadways, fault locations, fault displacements and fault angles.

The spatial coordinate sets of the upper and lower interfaces of the rock strata are obtained by analyzing the geological borehole histogram. Because of fixed latitude distance and longitude distance of each borehole, the horizontal coordinate X and the vertical coordinate Y in the coordinate set of the boreholes can be directly obtained. According to the number p of rock strata and a buried depth $h_j$, the coordinate set of the boreholes can be obtained as (X, Y, $h_1$), (X, Y, $h_2$), ..., (X, Y, $h_j$), ..., (X, Y, $h_{p+1}$) from top to bottom, where $h_j \leq h_{p+1}$. All obtained coordinates are classified according to the geological unit "section" first, and further classified according to different rock stratum in each "section", so that spatial coordinate sets of the upper and lower interfaces of the rock strata are obtained.

S2. Establishing a three-dimensional point could database of the mine;
1) determining the model accuracy ε (ε<1) according to the simulation requirements;
2) determining a criteria for extracting the three-dimensional point cloud data of the mine and a minimum significant coefficient for the extracted spatial coordinate sets of the rock interfaces;

Supposing there are m spatial coordinate sets of rock interfaces and n criteria for extracting the three-dimensional point cloud data of the mine, $P_k$ is a significant coefficient of the $k^{th}$ spatial coordinate set of the rock interfaces, $X_i$ is a significant coefficient of a criterion i in the n criteria for extracting the three-dimensional point cloud data of the mine, $w_i$ is the weight of the criterion i, and l is a correction coefficient, then:

$$P_k = \sum_{i=1}^{n} w_i X_i + l \ (1 \leq k \leq m, 1 \leq i \leq n)$$

where $$\sum_{i=1}^{n} = 1, X_i \in (0, 10), l \in (0, 1),$$

determining a minimum significant coefficient $P_{min}$ for the extracted spatial coordinate sets of the rock interfaces, which meets $$\frac{P_{min}}{P_{max}} > \varepsilon,$$

according to the simulation requirements.

3) directly extracting the spatial coordinate sets of the rock interfaces that meet $P_k \geq P_{min}$ into the three-dimensional point cloud database of the mine and designate names to them respectively;
4) Categorize the spatial coordinate sets for remaining rock interfaces into two categories, i.e., coordinate sets that meet $$\frac{P_k}{P_{max}} \geq \alpha\varepsilon$$

or coordinate sets that meet $$\frac{P_k}{P_{max}} < \alpha\varepsilon,$$

where $\alpha$ is an adjustable coefficient and $\alpha \in (0, 1)$, deleting rock strata that meet $$\frac{P_k}{P_{max}} < \alpha\varepsilon,$$

i.e., combining the rock strata with neighboring rock strata that meet $$\frac{P_k}{P_{max}} \geq \alpha\varepsilon$$

to obtain new coordinate sets for rock interfaces, and extracting the coordinate sets into the three-dimensional point cloud database of the mine and designate names to them respectively.

S3. Constructing an underground part of a three-dimensional geological model that reproduces fault morphology, mining areas and roadways;
  1) importing the spatial coordinate sets of upper and low interfaces of the identified rock strata into Rhino software, and fit the rock interfaces hierarchically from bottom to top with the Rhino software; establish a cuboid model according to the dimensions of the model, cut the rock strata according to the rock interfaces obtained through the fitting and designate names to the rock strata respectively, so as to obtain an three-dimensional underground geological model;
  2) establishing fault boundaries according to the fault locations, and cutting the coal seam according to the fault angles; and adjusting the cut coal seam according to the fault displacements to reproduce fault morphology;
  3) inputting the spatial coordinate set of the inflection points of mining sections and the spatial coordinate set of the inflection points of key roadways into the Rhino software, and fit the mining sections and key roadways at working faces and designate names to them respectively;
  4) performing Boolean operations on the spatial model of the rock strata, the mining sections and the key roadways, removing a redundant part in the spatial model of the rock strata, so as to form the underground part of the three-dimensional geological model of the entire mining area;

S4. establishing a three-dimensional geological model of the mine;
  establishing a three-dimensional geological model of the ground surface according to the spatial coordinate set of the contour lines of the ground surface, designating a name to it, and combining the two models together, so as to establish the three-dimensional geological model of the entire mining area;

S5. performing grid division on the model to obtain an digital model for mining inversion;
  performing grid division on the three-dimensional geological model of the entire mining area by using the grid division tool that comes with the Rhino software, where the grid dimension is set according to actual requirements, performing grid division on the model again by using a plug-in Griddle, and modifying grids by limiting a grid shape and maximum and minimum edge dimensions, so as to make the grid change uniform; exporting the model as a grid file that can be recognized by a simulation software, and importing the grid file into the simulation software, so as to obtain a digital model for mining inversion of the entire mine.

The present disclosure provides a digital mine modeling method based on a three-dimensional point cloud database. The method provided by the present disclosure will be explained in detail by taking a mine as an example.

S1. Collecting data;
  Collecting a mining engineering plan, an engineering geological profile map, a geological borehole histogram, and a contour map of the coal seam floor of the target mining area, determining the dimensions of the model, and analyzing and obtaining spatial coordinate sets of the upper and lower rock interfaces, a spatial coordinate set of the inflection points of mining sections, a spatial coordinate sets of the inflection points of key roadways, fault locations, fault displacements and fault angles.

The spatial coordinate sets of the upper and lower interfaces of the rock strata are obtained by analyzing the geological borehole histogram. Because of fixed latitude distance and longitude distance of each borehole, the horizontal coordinate X and the vertical coordinate Y in the coordinate set of the boreholes can be directly obtained. According to the number p of rock strata and a buried depth $h_j$, the coordinate set of the boreholes can be obtained as $(X, Y, h_1), (X, Y, h_2), \ldots, (X, Y, h_j), \ldots, (X, Y, h_{p+1})$ from top to bottom, where $h_j \leq h_{p+1}$. All obtained coordinates are classified according to the geological unit "section" first, and further classified according to different rock stratum in each "section", so as to obtain m ($m \geq p+1$) spatial coordinate sets of the upper and lower interfaces of the rock strata.

Figure 2:
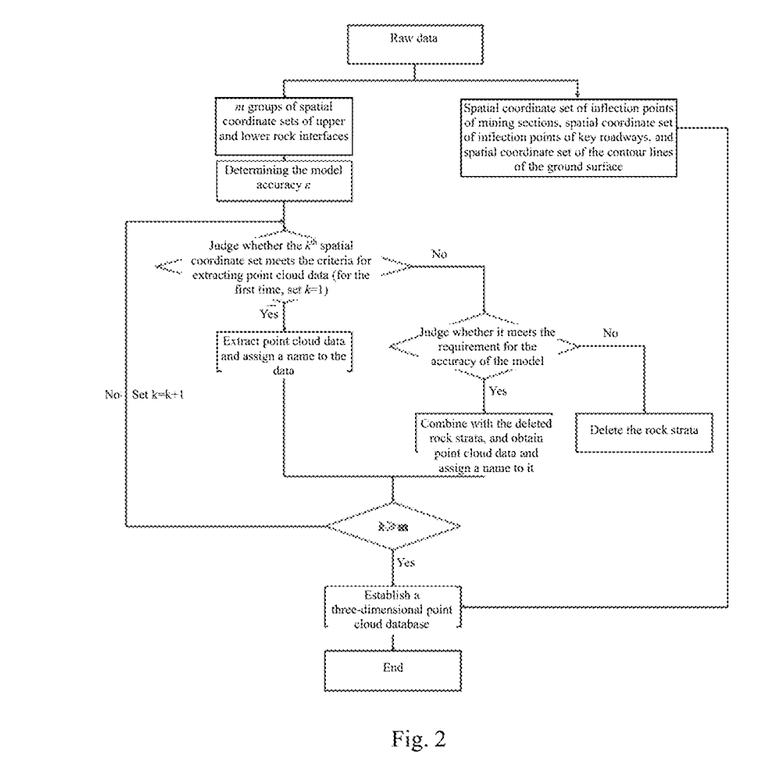
FIG. 2 is a flow chart of establishing a point cloud database in an embodiment of the present disclosure.

S2. Establishing a three-dimensional point cloud database of the mine according to the flow in FIG. 2 which is a flow chart for establishing a three-dimensional point cloud database according to an embodiment;
  1) determining the model accuracy $\varepsilon$ as 0.4, an adjustable coefficient $\alpha$ as 0.8 according to the simulation requirements;

2) determining the criteria for extracting the three-dimensional point cloud data of the mine and a minimum significant coefficient for the extracted spatial coordinate sets of the rock interfaces;

Suppose there are 4 criteria for extracting the three-dimensional point cloud data of the mine, $P_k$ is a significant coefficient of the $k^{th}$ spatial coordinate set of the rock interfaces, and $X_i$ is a significant coefficient of a criterion i in the 4 criteria for extracting the three-dimensional point cloud data of the mine, wherein the criterion 1 is a thickness of rock stratum, and $w_1=0.4$; the criterion 2 is stratigraphic stability, and $w_2=0.3$; the criterion 3 is distribution range, and $w_3=0.2$; the criterion 4 is borehole density, and $w_4=0.1$; the specific values of $X_1$, $X_2$, $X_3$ and $X_4$ are shown in Table 1, Table 2, Table 3 and Table 4. The correction coefficient l is 0.5.

$$P_k = \sum_{i=1}^{4} w_i X_i + l = 0.4X_1 + 0.3X_2 + 0.2X_3 + 0.1X_{4a} + 0.5$$

$$(1 \le k \le 4)$$

A minimum significant coefficient $P_{min}$ for the extracted three-dimensional coordinate sets of the rock interfaces is determined as 7 according to the simulation requirements, and $P_{max}$ is 10.5, which meets $$\frac{P_{min}}{P_{max}} > \varepsilon.$$

$$\frac{P_k}{P_{max}} \ge \alpha\varepsilon,$$

i.e., $P_k \ge 3.36$;

$$\frac{P_k}{P_{max}} < \alpha\varepsilon,$$

i.e., $P_k < 3.36$.

TABLE 1

Thickness of Rock Stratum and Value of $X_1$

| Thickness of rock stratum | ≤0.5 m | 0.5 m to 5 m | 5 m to 10 m | 10 m to 20 m | ≥20 m |
|---|---|---|---|---|---|
| $X_1$ | 1 | 2 | 5 | 7 | 10 |

TABLE 2

Stratigraphic Stability and Value of $X_2$

| Stratigraphic stability | Very unstable | Less Unstable | Normal | More Stable | Very stable |
|---|---|---|---|---|---|
| $X_2$ | 1 | 2 | 5 | 7 | 10 |

TABLE 3

Distribution Range and Value of $X_3$

| Distribution range | ≤30% | 30%-50% | 50%-70% | 70%-90% | ≥90% |
|---|---|---|---|---|---|
| $X_3$ | 1 | 3 | 5 | 7 | 10 |

TABLE 4

Borehole Density and Value of $X_4$

| Borehole density | Very Disperse | Disperse | Normal | More Dense | Very dense |
|---|---|---|---|---|---|
| $X_4$ | 1 | 3 | 5 | 7 | 10 |

3) directly extracting the spatial coordinate sets of the rock interfaces that meet $P_k \ge 7$ into the three-dimensional point cloud database of the mine and designate names to them respectively;
4) categorizing the spatial coordinate sets for remaining rock interfaces into two categories, i.e., coordinate sets that meet $P_k \ge 3.36$ or coordinate sets that meet $P_k < 3.36$, deleting rock strata that meet $P_k < 3.36$, i.e., combining the rock strata with neighboring rock strata that meet $P_k \ge 3.36$ to obtain new coordinate sets for rock interfaces, and extracting the coordinate sets into the three-dimensional point cloud database of the mine and designate names to them respectively.

Figure 3:
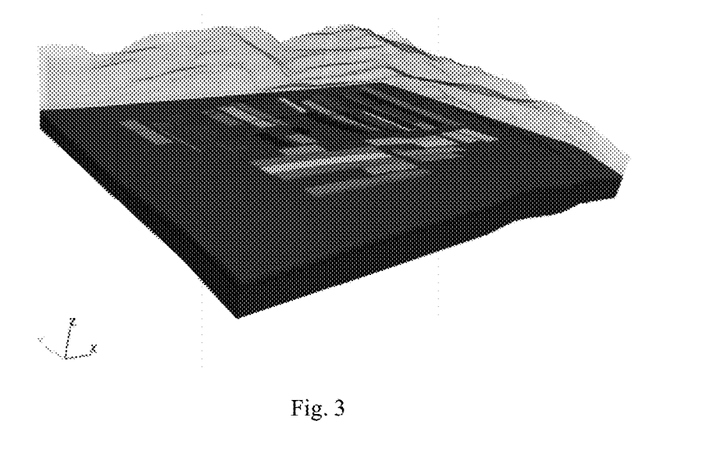
FIG. 3 is a schematic diagram of a equal-proportion three-dimensional geological model in an embodiment of the present disclosure.

S3. Establishing an underground part of a three-dimensional geological model that reproduces fault morphology, mining areas and roadways;

1) importing the spatial coordinate sets of upper and low interfaces of the identified rock strata into Rhino software, and fitting the rock interfaces hierarchically from bottom to top with the Rhino software; establishing a cuboid model according to the dimensions of the model, cutting the rock strata according to the rock interfaces obtained through the fitting the rock strata and designate names to the rock strata respectively, so as to obtain a three-dimensional underground geological model;
2) establishing fault boundaries according to the fault locations and cutting the coal seam according to the fault angles; and adjusting the cut coal seam according to the fault displacements to reproduce fault morphology;
3) inputting the spatial coordinate set of the inflection points of mining sections and the spatial coordinate set of the inflection points of key roadways into the Rhino software, and fitting the mining sections and the key roadways at working faces and designating names to them respectively;
4) performing Boolean operations on the spatial model of the rock strata, the mining sections and the key roadways, remove a redundant part in the spatial model of the rock strata, so as to form the underground part of the three-dimensional geological model of the entire mining area;

S4. Establishing a three-dimensional geological model of the mine;

establishing a three-dimensional geological model of the ground surface according to the spatial coordinate set of the contour lines of the ground surface, designating a name to it, and combining the two models together, so as to establish the three-dimensional geological model of the entire mining area;

S5. Perform grid division on the model to obtain an inversed digital model for mining in the mine;

Preliminarily grid the three-dimensional geological model of the entire mining area by using the grid division tool that comes with the Rhino software, where the grid dimension is set according to the actual requirements, performing grid division on the model again by using a plug-in Griddle, and modifying grids by limiting a grid shape and maximum and minimum edge dimensions, so as to make grid change uniform; exporting the model as a grid file that can be recognized by a simulation software, and import the grid file into the simulation software, so as to obtain a digital model for mining inversion of the entire mine as shown in FIG. 3.

The above embodiments are used only to illustrate the technical solution of the disclosed subject matter, and not to limit the present disclosure. While the present disclosure is described in detail according to the above embodiments, those skilled in the art should appreciate that various modifications may be made to the technical solution described in the above embodiments or equivalent replacements may be made to some or all technical features in the technical solution; however, all such modifications or replacements do not make the nature of the technical solution depart from the scope defined by the claims.

The invention claimed is:

1. A digital mine modeling method based on a three-dimensional point cloud database, comprising: collecting mine data, extracting effective coordinate point position information of rock interfaces according to criteria for extracting point cloud data, establishing a three-dimensional point cloud database of a mine; establishing a model of rock interfaces, mining areas and roadways by using the three-dimensional point cloud data of the mine, establishing a three-dimensional geological model of ground surface, so as to establish a three-dimensional geological model of the mine; perform grid division on the three-dimensional geological model of the mine, so as to obtain a digital model for mining inversion that reproduces each identified rock strata relief, mining areas and roadway locations, fault morphology and surface morphology, and improve fitness and accuracy of the model;

the method comprising:

S1. determining dimensions of the model by collecting geological data of a target mining area, and analyzing and obtaining spatial coordinate sets of upper and lower interfaces of each rock stratum, a spatial coordinate set of inflection points of mining sections, a spatial coordinate set of inflection points of key roadways, a spatial coordinate set of contour lines of the ground surface, fault locations, fault displacements and fault angles;

S2. processing the spatial coordinate sets of the upper and lower interfaces of each rock stratum, extracting effective coordinate point position information, and establishing a three-dimensional point cloud database of the mine;

S2.1. determining the accuracy $\varepsilon(0<\varepsilon<1)$ of the model according to simulation requirements;

S2.2. determining a criteria for extracting the three-dimensional point cloud data of the mine and a minimum significant coefficient for the extracted spatial coordinate sets of the rock interfaces;

supposing there are m spatial coordinate sets of rock interfaces and n criteria for extracting the three-dimensional point cloud data of the mine, calculating a significant coefficient $P_k$ for a $k^{th}$ spatial coordinate set of rock interfaces with a following formula:

$$P_k = \sum_{i=1}^{n} w_i X_i + l \quad (1 \le k \le m, 1 \le i \le n)$$

$$\sum_{i=1}^{n} w_i = 1, X_i \in (0, 10), l \in (0, 1);$$

wherein $X_i$ is a significant coefficient of a criterion i in the n criteria for extracting the three-dimensional point cloud data of the mine, $w_i$ is a weight of the criterion i, and l is a correction coefficient;

determining a minimum significant coefficient $P_{min}$ for the extracted spatial coordinate sets of the rock interfaces, which meet $$\frac{P_{min}}{P_{max}} > \varepsilon,$$

according to the simulation requirements, wherein $P_{max}$ is a maximum significant coefficient;

S2.3. directly extracting the spatial coordinate sets of the rock interfaces that meet $P_k \ge P_{min}$ into the three-dimensional point cloud database of the mine and designating names to them respectively;

S2.4. categorizing spatial coordinate sets for remaining rock interfaces into two categories, i.e., coordinate sets that meet $$\frac{P_k}{P_{max}} \ge \alpha\varepsilon$$

or coordinate sets that meet $$\frac{P_k}{P_{max}} < \alpha\varepsilon,$$

wherein $\alpha$ is an adjustable coefficient and $\alpha \in (0, 1)$, deleting the rock strata that meet $$\frac{P_k}{P_{max}} < \alpha\varepsilon,$$

i.e., combining the rock strata with neighboring rock strata that meet $$\frac{P_k}{P_{max}} \ge \alpha\varepsilon$$

to form new coordinate sets of rock interfaces, and extracting the coordinate sets into the three-dimensional point cloud database of the mine and designating names to them respectively;

S3. establishing an underground part of a three-dimensional geological model that reproduces fault morphology, mining areas and roadways;

S3.1. importing spatial coordinate sets of upper and low interfaces of identified rock strata into Rhino software, and fitting the rock interfaces hierarchically from bottom to top with the Rhino software; establishing a cuboid model according to the dimensions of the model, cutting the rock strata according to the rock interfaces obtained through the fitting and designating names to the rock strata respectively, so as to obtain a three-dimensional underground geological model in a cuboid structure;

S3.2. establishing fault boundaries according to the fault locations, cutting coal seam according to the fault angles; and adjusting the cut coal seam according to the fault displacements to reproduce fault morphology;

S3.3. inputting the spatial coordinate set of the inflection points of the mining sections and the spatial coordinate set of the inflection points of the key roadways into the Rhino software, and fitting the mining sections and the key roadways at working faces and designating names to them respectively;

S3.4. performing Boolean operations on the spatial model of the rock strata, the mining sections and the key roadways, removing a redundant part in the spatial model of the rock strata, so as to form an underground part of a three-dimensional geological model of an entire mining area;

S4. establishing a three-dimensional geological model of the ground surface according to the spatial coordinate set of the contour lines of the ground surface, designating a name to it, and combining the two models together, so as to establish the three-dimensional geological model of the entire mining area;

S5. performing grid division on the three-dimensional geological model of the entire mining area by using a grid division tool that comes with the Rhino software, setting a grid dimension according to actual requirements, performing grid division on the model again by using a plug-in Griddle, and modifying grids by limiting a grid shape and maximum and minimum edge dimensions, so as to make grid change uniform; exporting the model as a grid file that can be recognized by FLAC 3D software, and importing the grid file into the simulation software, so as to obtain a digital model for mining inversion of the entire mine.

2. The digital mine modeling method based on a three-dimensional point cloud database according to claim 1, wherein the geological data collected in the step S1 comprises a mining engineering plan, an engineering geological profile, a geological borehole histogram and a contour map of coal seam floor of the target mining area; the spatial coordinate sets of the upper and lower interfaces of the rock strata, the spatial coordinate set of the inflection points of the mining sections, the spatial coordinate set of the inflection points of key roadways, the spatial coordinate set of the contour lines of the ground surface, the dimensions of the model, the fault locations, the fault angles and the fault displacements are obtained by analyzing the geological data of the target mining area, and the key roadways refer to return-air roadways and haulage roadways of sections.

3. The digital mine modeling method based on a three-dimensional point cloud database according to claim 1, wherein the spatial coordinate sets of the upper and lower interfaces of the rock strata in the step S1 are obtained by analyzing the geological borehole histogram; with fixed latitude distance and longitude distance of each borehole, horizontal coordinate X and vertical coordinate Y in a coordinate set of boreholes can be directly obtained; the coordinate set of the boreholes can be obtained as $(X, Y, h_1)$, $(X, Y, h_2), \ldots, (X, Y, h_j), \ldots, (X, Y, h_{p+1})$ from top to bottom according to a number p of rock strata and a buried depth $h_j$, wherein $h_j \leq h_{p+1}$; all obtained coordinates are classified according to a geological unit "section", and classified again according to different rock strata in each "section", so that the spatial coordinate sets of the upper and lower interfaces of the rock strata are obtained.

4. The digital mine modeling method based on a three-dimensional point cloud database according to claim 1, wherein the accuracy $\varepsilon$ of the model in the step S2 is precision of simulation model reproduction determined according to the simulation requirements, which can be precision of some local continuous strata reproduction or precision of all the strata reproduction; the richer the geological data is and the denser the geological boreholes are, the higher the maximum accuracy of the model reproduction is; because it is impossible to achieve 100% reproduction of underground appearance of the mine, $\varepsilon$ is smaller than 1.

5. The digital mine modeling method based on a three-dimensional point cloud database according to claim 1, wherein the criteria for extracting three-dimensional point cloud data of the mine in the step S2 are detailed requirements determined according to the simulation requirements, the underground rock morphology of the mine, the geological borehole histogram, and the spatial coordinate sets of rock interfaces, and the precision of the detailed requirements directly influences the establishment of the three-dimensional point cloud database of the mine.

6. The digital mine modeling method based on a three-dimensional point cloud database according to claim 1, wherein the identified rock strata in the step S3 refer to rock strata identified in the three-dimensional point cloud database of the mine; the higher the accuracy of the model is and the more detailed the criteria for extracting the three-dimensional point cloud data of the mine is, the more a number of identified rock strata is; identified strata gradually formed chronologically in long geological period can be used to distinguish stratigraphic information and geological age in process of geological investigation, borehole exploration and mining.

7. The digital mine modeling method based on a three-dimensional point cloud database according to claim 1, wherein in the step S3, since the mining sections and the key roadways spatially overlap with the spatial model of the rock strata respectively, a difference operation in the Boolean operation function of software is used to perform the difference operation on the spatial model of the rock strata, the mining sections and the key roadways, so as to cut out the mining sections and the key roadways in the spatial model of the rock strata and avoid overlapping of spatial locations, so that the spatial model of the rock strata, the mining sections and the key roadways constitute the underground part of the three-dimensional geological model of the entire mining area.

* * * * *